US009456365B2

(12) United States Patent
Li et al.

(10) Patent No.: US 9,456,365 B2
(45) Date of Patent: *Sep. 27, 2016

(54) VIRTUALIZED WIRELESS COMMUNICATION SYSTEM AND ESTABLISHING METHOD THEREOF

(71) Applicant: International Business Machines Corporation, Armonk, NY (US)

(72) Inventors: Li Li, Beijing (CN); Liang Liu, Beijing (CN); Junmei Qu, Beijing (CN); Yu Yuan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,068

(22) Filed: Apr. 20, 2015

(65) Prior Publication Data

US 2015/0230101 A1     Aug. 13, 2015

Related U.S. Application Data

(63) Continuation of application No. 13/833,040, filed on Mar. 15, 2013, now Pat. No. 9,167,455.

(30) Foreign Application Priority Data

Mar. 31, 2012 (CN) .......................... 2012 1 0092334

(51) Int. Cl.
*H04W 24/06* (2009.01)
*H04W 16/22* (2009.01)
*H04L 12/46* (2006.01)

(52) U.S. Cl.
CPC .......... *H04W 24/06* (2013.01); *H04L 12/4641* (2013.01); *H04W 16/22* (2013.01)

(58) Field of Classification Search
CPC .. H04W 24/06; H04W 16/22; H04L 12/4641
USPC ......................................... 370/254; 709/223
See application file for complete search history.

(56) References Cited

U.S. PATENT DOCUMENTS

| 7,277,395 | B2 | 10/2007 | Rosen et al. |
| 7,911,990 | B2 | 3/2011 | Alam et al. |
| 2007/0147236 | A1 | 6/2007 | Lee |

OTHER PUBLICATIONS

Jeff Ahrenholz et al., Core: A Real-Time Network Emulator, Proceedings of the IEEE Military Communications Conference (MILCOM), Nov. 2008, pp. 221-227.
S. Maier et al., Experiences with Node Virtualization for Scalable Network Emulation, 30 Computer Communications, 2007, pp. 943-956.
S. Maier et al., On Node Virtualization for Scalable Network Emulation, Proceedings of the 2005 International Symposium on Performance Evaluation of Computer and Telecommunication Systems (SPECTS 05), Jul. 24, 2005, pp. 917-928, Philadelphia, PA.

*Primary Examiner* — Ricky Ngo
*Assistant Examiner* — Richard Chang
(74) *Attorney, Agent, or Firm* — Cantor Colburn LLP; Kurt Goudy

(57) ABSTRACT

The present application discloses a virtualized wireless communication network and an establishing method thereof. The virtualized wireless communication network system includes a plurality of virtual nodes, the plurality of virtual nodes being divided into multiple virtual node cliques according to interference relations among the plurality of virtual nodes, wherein, each virtual node represents a wireless communication node; and a plurality of clique communication management modules that are one-to-one associated with the multiple virtual node cliques, wherein, each clique communication management module is configured to manage data exchange between an associated virtual node clique and other virtual node cliques, so as to emulate communication behavior of the wireless communication node. The present invention has many advantages such as high flexibility, good scalability, low cost and the like. Compared with a centralized virtualization solution, this solution can significantly reduce management data overhead and thus enhance the real-time behavior of the whole system.

7 Claims, 4 Drawing Sheets

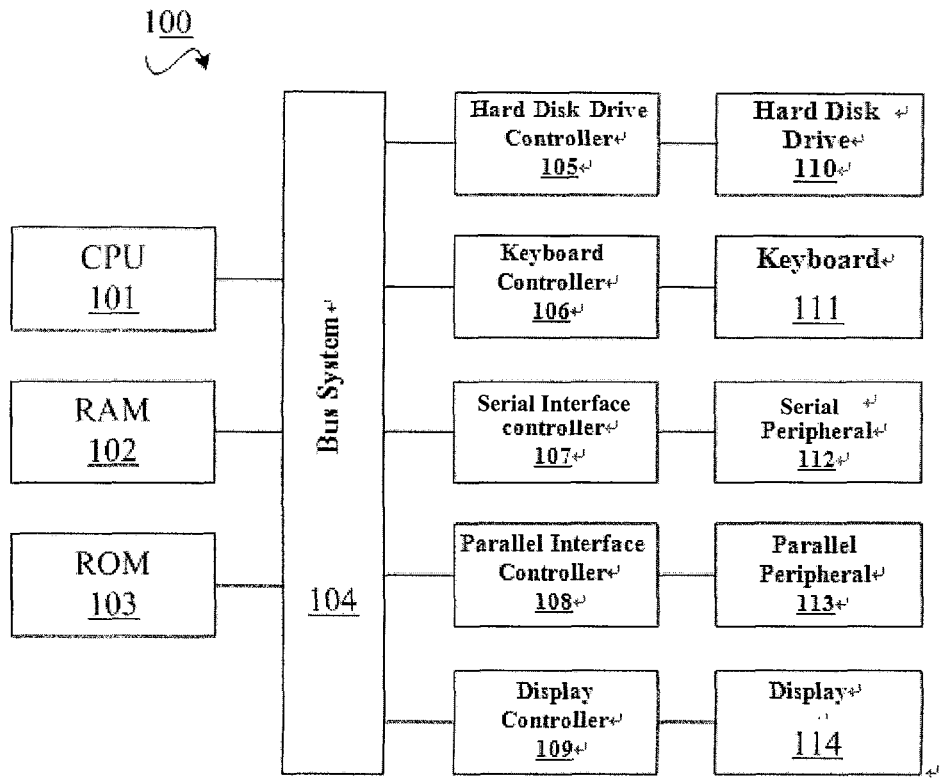
Fig. 1
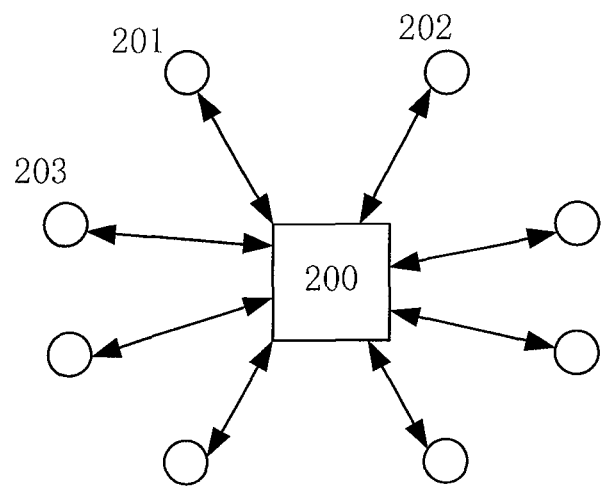
Fig. 2 [Prior Art]

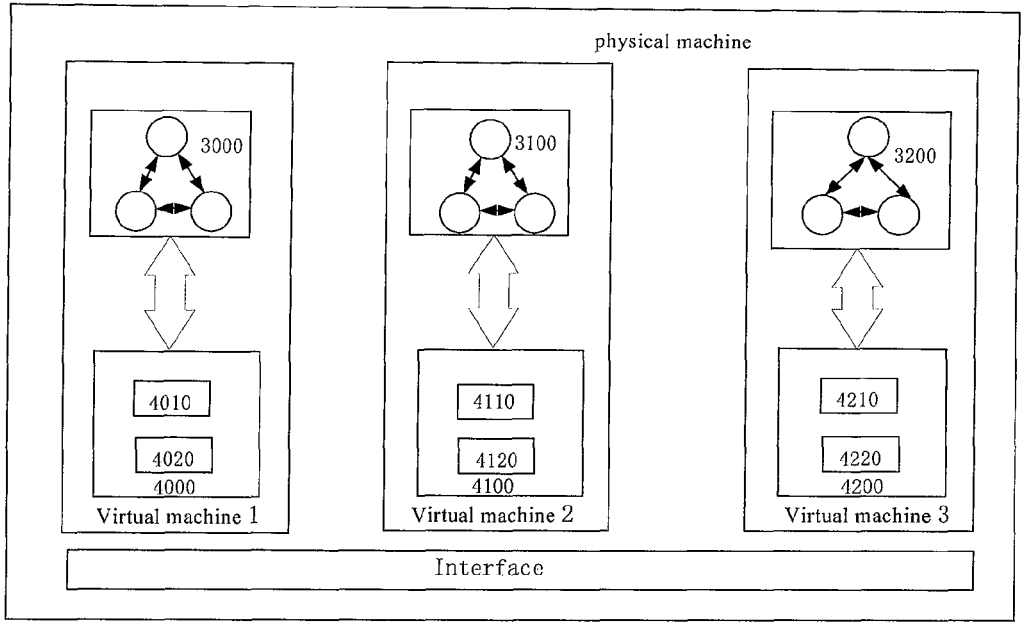

Fig. 7 setting up a plurality of virtual nodes, dividing the plurality of virtual nodes into multiple virtual node cliques according to interference relations among the plurality of virtual nodes, wherein, each virtual node represents one wireless communication node — 801 deploying a clique communication management module for each virtual node clique, for managing data exchange between the virtual node clique and other virtual node cliques so as to emulate communication behavior of the wireless communication node — 802

Fig. 8

VIRTUALIZED WIRELESS COMMUNICATION SYSTEM AND ESTABLISHING METHOD THEREOF

CROSS-REFERENCE TO RELATED APPLICATION

This application is a continuation of U.S. patent application Ser. No. 13/833,040, filed Mar. 15, 2013, which claims priority under 35 U.S.C. §119 from Chinese Patent Application No. 20120092334.7 filed Mar. 31, 2012, the entire contents of which are incorporated herein by reference.

BACKGROUND OF THE INVENTION

1. Field of the Invention

The present invention relates to a virtualized wireless communication system and an establishing method thereof.

2. Description of Related Art

With the advancement of wireless communication technologies, the development of various wireless communication protocols and wireless communication technologies has attracted more and more attention. As for a new wireless communication technology, it is necessary to evaluate its operation performance prior to practical application.

Generally speaking, there are two existing methods for evaluating a wireless communication technology. One is to set up a real communication system (e.g. including a plurality of nodes, servers, or the like) in a real-world environment, implement the developed wireless communication technology on the system and then evaluate its performance. However, obviously, such method is limited by site, maintenance, hardware cost, and the like. Thus, only in a small range of cases (with fewer communication nodes and smaller test area) can such evaluation be performed, which limits the accuracy and practicability of the evaluation.

The other method is the proposed method for evaluating a new technology's performance using a virtualized wireless network. For example, it has been proposed using a computer or a virtual machine to emulate nodes in a wireless network, so as to emulate behavior in the whole wireless communication network such as signal transmission, thereby evaluating the performance of a new technology. This method has some advantages such as low cost, good scalability, convenience and flexibility, and thus has a broader application prospect.

When using a virtualized wireless network, it is necessary to ensure conformity of the communication behavior of each virtual node with the behavior of nodes in a real wireless communication. For example, in a real wireless network, interference can exist between several mutually adjacent communication nodes. As a result, when these nodes attempt to transmit data at the same time, loss of data packets can occur because of the existence of interference. Therefore, when implementing a virtualized network, it is also necessary to emulate such interference case.

In addition, as for IEEE.802.11 protocol based communication, sending data and receiving data requires calculating the communication quality of signals. For example, when the signal-to-noise ratio of the received data packet is lower than a predetermined threshold, it is deemed that information carried by this data packet has changed to a great extent, and thus, this data packet can be discarded. Based on the teachings of the present invention, one of ordinary skill in the art can apply the essence and spirit contained herein to other communication protocols.

In the prior art, for example, in "Wireless Network Emulation System (WiNE), Final Technical Report" by Gavin Holland from HRL Laboratories, LLC on Mar. 30, 2005, a technical solution of emulating a wireless communication network using virtual machine and virtual node has been proposed. According to the prior art, virtual nodes are disposed on virtual machine, and virtual machines are provided on physical machine as many as possible, so as to emulate wireless nodes as many as possible. In this way, a wired network environment is actually used for emulating behavior of wireless communication. In the prior art, a virtual central server is provided in order to emulate communication behavior of wireless nodes, wherein, communication behavior (e.g. sending and receiving) of all the virtual nodes are firstly reported to this central server.

More specifically, this central server knows the arrangement of all the virtual nodes, the interferences there between, all the parameters of the emulated communication, and the like, and hereby decides communication behavior of each virtual node. As shown in FIG. 2, for example, when one virtual node 201 wishes to send out one data packet, it first reports this behavior to the central server 200. At this point, the central server determines other virtual nodes, e.g., 202 and 203, that can affect the sending behavior of virtual node 201, and decides whether or not virtual node 201 can successfully send out the data packet according to the statuses of these nodes. For example, when the central server 200 notes that another virtual node 202 is in the neighborhood of the virtual node 201 is also sending data (which indicates that wireless communication interference exists), the central server 200 calculates channel quality, interference intensity between the two virtual nodes, and the like based on preset parameters of the virtualized network, wherein, if the calculation result shows that the interference from the virtual node 202 is sufficiently strong to lead the virtual node 201 to fail to send signals, the central server 200 indicates that the virtual node 201 at this time failed to send signals. On the other hand, when the virtual node 201 receives data, the central server 200 calculates the signal-to-noise ratio of the received data packet based on behavior of other nodes, network environment, and communication parameters, wherein, if the signal-to-noise ratio is lower than a predetermined threshold, the virtual node 201 that is receiving data packet is instructed to discard the data packet and re-transmission is requested. When the server deems that the communication is successful, data packets among the respective virtual nodes are allowed to be transmitted via a wired network (not shown).

As can be seen from the above technical solution, the central server knows the communication conditions of all the virtual nodes and decides the behavior of the respective virtual nodes, thereby emulating wireless communication.

However, the above solution in the prior art has the following defects. Firstly, it can be seen that, all the communications are analyzed and assigned by the server. Thus, the central server becomes a performance bottleneck of the whole virtualized system. As the number of virtual nodes increases, the amount of the involved calculation can increase in a geometry level. Secondly, in this solution, each data packet must be initially analyzed and judged by the server, which impacts the real-time behavior of communication flows. Finally, purchasing a high-performance server will require a considerably high cost and expenditure, and the stability of the server also will become a critical factor for the whole virtualized network operation.

SUMMARY OF THE INVENTION

Accordingly, one aspect of the present invention provides a virtualized wireless communication network system including a plurality of virtual nodes. The plurality of virtual nodes is divided into multiple virtual node cliques according to interference relations among the plurality of virtual nodes, where each virtual node represents a wireless communication node. A plurality of clique communication management modules are one-to-one associated with the multiple virtual node cliques where each clique communication management module is configured to manage data exchange between an associated virtual node clique and other virtual node cliques, so as to emulate communication behavior of the wireless communication node.

Another aspect of the present invention provides a method for establishing a virtualized wireless communication network system. This method includes the steps of setting up a plurality of virtual nodes, dividing the plurality of virtual nodes into multiple virtual node cliques according to interference relations among the plurality of virtual nodes where each virtual node represents a wireless communication node; and deploying a clique communication management module for each virtual node clique where the clique communication management module is configured to manage data exchange between the each virtual node clique and other virtual node cliques, so as to emulate communication behavior of the wireless communication node.

According to the embodiments of the present invention shown below, the technical solution has many advantages over the prior art such as high flexibility, good scalability, low cost and the like. Compared with a centralized virtualization solution, this solution can significantly reduce management data overhead and thus enhance the real-time behavior of the whole system.

BRIEF DESCRIPTION OF THE DRAWINGS

FIG. 1 shows a block diagram of an exemplary computing system which is applicable to implement the embodiments of the present invention.

FIG. 2 shows a system of a virtualized wireless network according to the prior art.

FIG. 7 shows a diagram of using a PM (physical machine)-VM (virtual machine) structure to implement the virtualized wireless network of the present invention, according to one exemplary embodiment of the present invention.

FIG. 8 shows a flowchart of a method for establishing a virtualized wireless network according to the embodiments of the present invention.

DETAILED DESCRIPTION OF THE PREFERRED EMBODIMENTS

Figure 3:
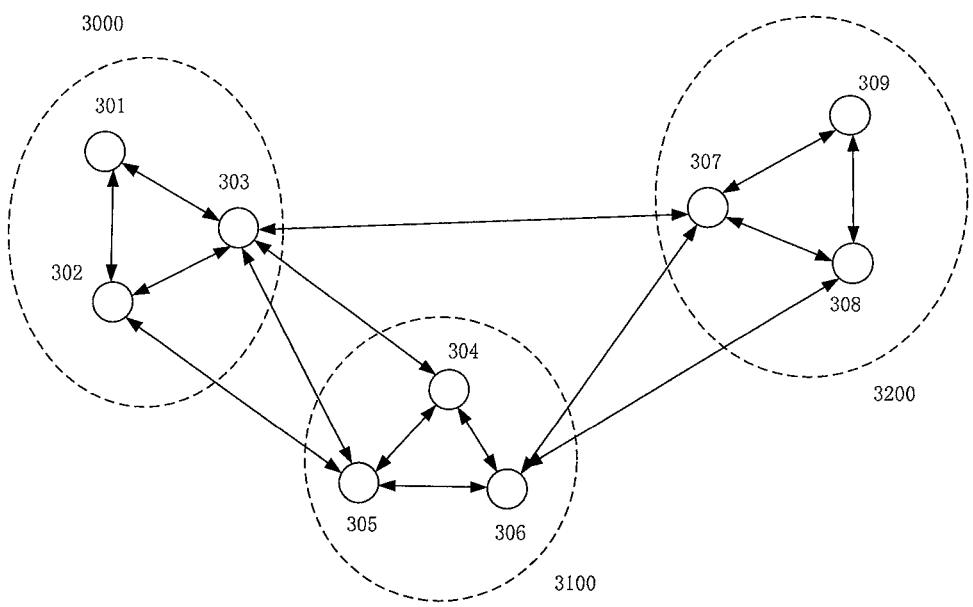
FIG. 3 shows an interference graph among virtual nodes according to an embodiment of the present invention and a diagram of virtual node grouping formed based on this interference graph.

Preferred embodiments of the present disclosure will be described in greater detail below with reference to the accompanying drawings. The accompanying drawings have shown those preferred embodiments of the present disclosure, however, it should be understood that, the present disclosure can be implemented in various forms, but are not limited to these embodiments illustrated herein. On the contrary, these embodiments are provided for making the present disclosure more thorough and complete, such that the scope of the present disclosure can be completely delivered to one of ordinary skill in the art.

FIG. 1 shows a block diagram of an exemplary computing system 100 which is applicable to implement the embodiments of the present invention. As shown in FIG. 1, the computing system 100 can include: CPU (Central Processing Unit) 101, RAM (Random Access Memory) 102, ROM (Read Only Memory) 103, system bus 104, hard drive controller 105, keyboard controller 106, serial interface controller 107, parallel interface controller 108, display controller 109, hard drive 110, keyboard 111, serial peripheral equipment 112, parallel peripheral equipment 113 and display 114. Among above devices, CPU 101, RAM 102, ROM 103, hard drive controller 105, keyboard controller 106, serial interface controller 107, parallel interface controller 108 and display controller 109 are coupled to the system bus 104. Hard drive 110 is coupled to hard drive controller 105. Keyboard 111 is coupled to keyboard controller 106. Serial peripheral equipment 112 is coupled to serial interface controller 107. Parallel peripheral equipment 113 is coupled to parallel interface controller 108. And, display 114 is coupled to display controller 109. It should be understood that the structure as shown in FIG. 1 is only for the exemplary purpose rather than any limitation to the present invention. In some cases, some devices can be added to or removed from the computer system 100 based on specific situations.

As will be appreciated by one of ordinary skill in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wire, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Unlike the prior art which provides for a centralized virtual structure, the embodiments of the present invention provide for a distributed virtualized wireless communication system. In the virtualized wireless network system associated with the present invention, there is no unique central server, instead, a plurality of virtual nodes is appropriately divided into multiple virtual node cliques according to interference relations among these virtual nodes, and then, as needed, these multiple virtual node cliques can be further appropriately grouped into virtual node clusters. Each virtual node clique is provided with a clique communication management module. A cluster communication management module can be deployed in virtual node cluster. The present invention provides coordination between clique communication and cluster communication so as to be capable of emulating wireless communication behavior in a wired communication environment. The present invention has many advantages such as high flexibility, good scalability, low cost, and the like. Compared with the centralized virtualization solution, the present invention can significantly reduce management data overhead and thus enhancing the real-time behavior of the whole system.

FIG. 3 shows an interference graph among virtual nodes according to an embodiment of the present invention and a diagram of virtual node grouping formed based on this interference graph. There are several virtual nodes 301-309 in virtualized wireless network. As known by one of ordinary skill in the art, virtual nodes can be realized by any suitable means. For example, appropriate computer applications can be used to emulate wireless nodes. However, application-specific integrated circuit (IC) also can be used to implement virtual wireless nodes. In other embodiments, virtual nodes can be implemented in a way of software/hardware modules and these modules can be provided on a physical machine or a virtual machine. These virtual nodes are mutually connected with each other through a wired network or in other manners. Some parameters such as distance among a plurality of virtual nodes, environment, e.g., whether or not a barrier is present, and channel signal strength can be set in advance according to specific test objective. In other words, in an actual environment, two real nodes can be close to each other or far away from each other. However, virtual nodes that emulate these two real nodes can be arranged as being adjacent to each other and the positional relation in the real world is reflected by setting parameters in the virtual nodes such as a distance from an adjacent node. The above technique for reflecting an actual node situation by setting parameters of virtual nodes is known in the art.

Next, an interference graph of the virtualized wireless network 300 is determined according to the predetermined parameters in the virtualized wireless network 300 and the actual position among nodes 301-309. As shown in FIG. 3, the double-headed arrow indicates mutual interference between two nodes. For one of ordinary skill in the art, forming an interference graph of a virtualized wireless network according to predetermined parameters of this virtualized wireless network is known.

Continuing to refer to FIG. 3, in this interference graph, maximum clique division of this interference graph can be determined. Maximum clique division of an interference graph can be determined using an existing algorithm in graph theory, which is known to one of ordinary skill in the art. For example, the maximum clique divisions 3000, 3100 and 3200 of this interference graph can be determined. Although nine virtual nodes and three maximum clique divisions are shown herein, one of ordinary skill in the art should understand that, the number of virtual nodes as well as the number of maximum clique divisions as described above are merely examples given for description. As shown in FIG. 3, for example, in the maximum clique division 3000, virtual nodes 301, 302 and 303 mutually interfere with one another in a pair-wise manner. Such nodes are divided into a same virtual node clique.

The reason behind such a division is that when real wireless nodes have interference relations as the interference relations among virtual nodes 301, 302 and 303, at the same moment, only one wireless node can receive data or transmit data while the other two wireless nodes cannot successfully transmit or receive data packets because of the interference relation there between and can only wait for re-transmission or discard data packets that are not successfully transmitted. The maximum clique division in the interference graph means that all the nodes in the clique mutually interfere with one another in pair-wise manner, and thus, at the same moment, only one node can transmit or receive data. Although herein the maximum clique division is shown in an exemplary way as including three virtual nodes, one of ordinary skill in the art should understand that, other number of virtual nodes is also possible.

Figure 4:
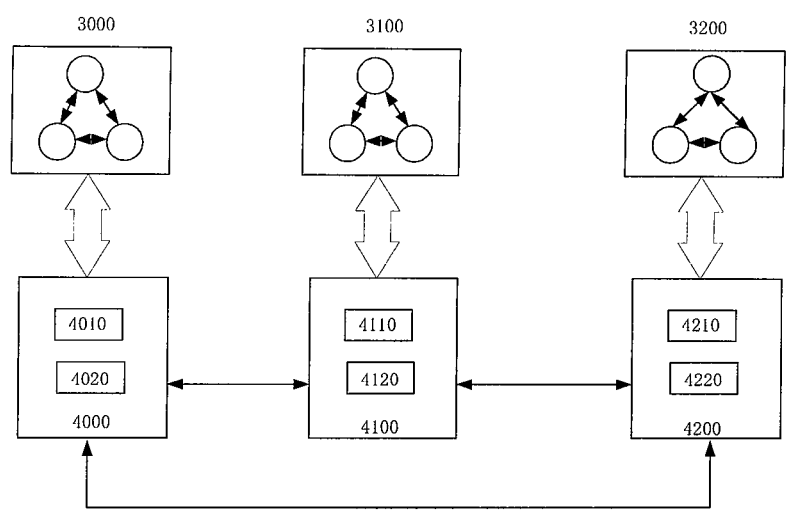
FIG. 4 shows a diagram of virtual node cliques and their associated clique communication management module according to the embodiments of the present invention.

As described above, virtual nodes 301, 302 and 303 are divided into a same clique, i.e., clique 3000, and a clique communication management module 4000 is deployed for this clique, as shown in FIG. 4. As will be described below, the clique communication management module 4000 takes charge of data exchange between its associated virtual node clique and other virtual node cliques, including management data for establishing a virtualized wireless network and communication data to be transmitted among the respective virtual nodes, such that the virtual nodes within clique 3000 emulates communication behavior of real wireless nodes.

Specifically speaking, under the control of the clique communication management module 4000, at the same moment, only one virtual node in this clique can receive or transmit data. Similarly, clique communication management modules 4100 and 4200 are deployed for virtual node cliques 3100 and 3200, such that, at the same moment, only one virtual node in each virtual node clique can receive or transmit data.

FIG. 4 shows mutual communication between virtual node cliques according to the embodiments of the present invention. As shown in FIG. 4, taking the clique communication management module 4000 as an example, it includes a clique transmission recording module 4010 and a clique interference coefficient calculating module 4020. Similarly, the clique communication management module 4100 includes a clique transmission recording module 4110 and a clique interference coefficient calculating module 4120. The clique communication management module 4200 comprises a clique transmission recording module 4210 and a clique interference coefficient calculating module 4220. The clique transmission recording module 4010 records each data transmission (e.g. transmission purpose, timestamp, channel quality) of the virtual node clique 3000, for being accessed by other cliques.

Figure 5:
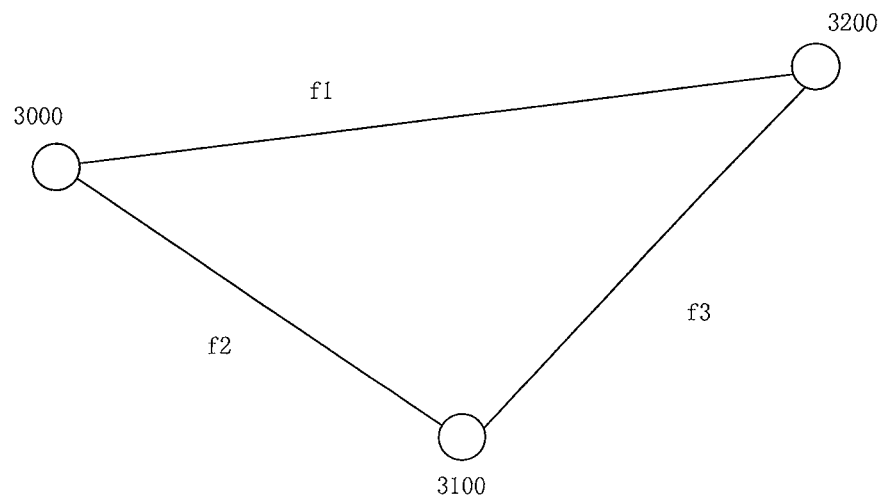
FIG. 5 shows a diagram of grouping virtual node cliques into multiple virtual node clusters according to the embodiments of the present invention.

The clique interference coefficient calculating module 4020 is used for calculating communication clique interference coefficient among the respective cliques. As shown in FIG. 3, when the maximum clique division of the interference graph is calculated, each maximum clique division serves as one clique and each clique is regarded as a new node, thereby re-generating an interference graph among cliques, as shown in FIG. 5. Referring to FIGS. 3 and 5, a clique interference coefficient between two cliques can be calculated using the following expression:

$$\max\left(\sum_N \frac{1}{N} \cdot \frac{m}{M}, \sum_M \frac{1}{M} \cdot \frac{n}{M}\right) \quad (1)$$

where N is the number of virtual nodes contained in clique N, M, is the number of virtual nodes contained in clique M that interferes with clique N, and where m is the number of nodes in clique M that interfere with the nodes in clique N, n is the number of nodes in clique N that interfere with the nodes in clique M.

Taking clique 3100 and clique 3200 as an example, node 306 in clique 3100 interferes with node 307 and node 308 in clique 3200, and thus, clique interference coefficient between clique 3100 and clique 3200 is ⅓*⅔=2/9. On the other hand, a probability that node 307 in clique 3200 can interfere with node 306 in clique 3100 is ⅓*⅓=1/9, while a probability that node 308 can interfere with node 306 is also ⅓*⅓=1/9, and thus, a probability that clique 3200 can interfere with clique 3100 is 1/9+1/9=2/9.

Therefore, the clique interference coefficient between clique 3100 and clique 3200 is determined as the largest one, that is, $$f_3 = \max\left(\frac{1}{3} \cdot \frac{2}{3}, \frac{1}{3} \cdot \frac{1}{3} + \frac{1}{3} \cdot \frac{1}{3}\right) = \frac{2}{9} \quad (2)$$

Similarly, the clique interference coefficient $f_1$ between clique 3000 and clique 3200 as well as the clique interference coefficient $f_2$ between clique 3000 and clique 3100 can be calculated as follows:

$$f_1 = \max\left(\frac{1}{3} \cdot \frac{1}{3}, \frac{1}{3} \cdot \frac{1}{3}\right) = \frac{1}{9} \quad (3)$$

$$f_2 = \max\left(\frac{1}{3} \cdot \frac{2}{3} + \frac{1}{3} \cdot \frac{1}{3}, \frac{1}{3} \cdot \frac{2}{3} + \frac{1}{3} \cdot \frac{1}{3}\right) = \frac{1}{3} \quad (4)$$

According to the present invention, within the virtualized wireless system, each virtual node clique accesses clique transmission recording modules of other virtual node cliques such that it interferes with another virtual node clique according to the calculated clique interference coefficients and probabilities. More specifically, taking clique 3000 and clique 3100 as an example, the calculated clique interference coefficient between these two cliques is ⅑, and thus, clique 3000 and clique 3100 each accesses the group transmission recording module of its counterpart with a probability of ⅑, so as to obtain data transmission information of its counterpart. For example, the clique communication management module can contain a random number generator which generates a random number taking an integer range of 1-9. When the random number is 1, it can access the clique transmission recording modules of other cliques. When it finds that clique 3100 is transmitting data at the time when it accesses the clique transmission recording module of clique 3100, it is deemed that the current data transmission of clique 3000 is interfered with by clique 3100, and thus the current data transmission is dropped, waiting for re-transmission or requiring data transmitting party to re-transmit. On the other hand, if it finds that clique 3100 is not transmitting data, then the communication of clique 3000 can run normally.

It needs to be noted that the above clique interference coefficient merely represents one emulation manner of mutual interference between cliques. In practice, when communication is dropped at a predetermined frequency between clique 3000 and clique 3200, the dropped communication does not necessarily represent the communication between node 303 and node 307; for example, instead it can represent communication between other nodes. However, as for the emulation and test objective of a wireless network, it is sufficient to emulate at a predetermined frequency a situation in which communication is interfered with, and dropping communication accuracy is not so important for most tested content.

On the other hand, the calculated ⅑ is merely an exemplary calculating manner. To some extent, it is a fairly strict emulation, i.e., every one out of nine times of communication must be interfered with. However, the present invention is not limited to this, and other emulation manners can be designed according to test objective, content or the like.

For example, ⅑ can be regarded as the probability of basic interference, and other factors can be added when taking communication conditions in a real wireless environment into consideration. In one embodiment, for example, a signal-to-noise ratio of the received signal can be calculated so as to further constrain this probability. When the signal-to-noise ratio is higher than a predetermined threshold, it is determined that this transmission can be successful, otherwise, the current transmission is dropped. In this embodiment, it can be known whether or not a node is transmitting data by accessing the clique transmission recording module of other nodes, possibly several that interfere with this node, and then noise, possibly several, can be calculated using the interference graph and the predetermined parameters; for example, the emulated distance between real nodes. Generally, in the virtualized wireless system, the channel signal strength is a preset parameter. Thus, the signal-to-noise ratio can be calculated using the above calculated noise and the channel signal strength. Moreover, whether or not to emulate interference is decided on the basis of a frequency of ⅑ in conjunction with the calculation of the signal-to-noise ratio.

In another embodiment, random disturbance can be added to clique interference coefficient, so as to get more close to the actual situation. For example, due to the existence of random disturbance, within some periods of time, communication can be dropped with a probability less than ⅑ (e.g. ¹⁄₁₀). One of ordinary skill in the art also can foresee some other disturbance manners.

In the embodiments according to the present invention, firstly, virtual nodes are divided into multiple cliques according to interference relations among these virtual nodes. In one embodiment, an interference graph among virtual nodes is generated, and the maximum clique division therein is identified. The maximum clique division of the interference graph of virtual nodes is regarded as the basis for virtual node grouping. As described above, after such grouping, under the control of the clique communication management module, at the same moment, only one of the several nodes within this clique can execute communication.

Compared with the centralized structure in the prior art, virtual node grouping can significantly save data overhead. In the present invention, a central server that knows the communication condition of every communication node is unnecessary. Each clique communication management module only needs to manage nodes within its own clique and access other related virtual node cliques at a certain frequency, and thus emulation of wireless communication in real environment can be realized.

Furthermore, according to the present invention, among the respective virtual node cliques, a clique interference coefficient among the respective virtual node cliques is calculated, and used as a frequency for accessing clique communication management modules of other virtual node cliques, thereby emulating interference among the respective cliques. This likewise significantly saves management data overhead. Once again, in the centralized structure of the prior art, the central server needs to know communication condition of every node and therefore, each node needs to report its data transmission situation to the central server in real-time. When one node therein attempts to transmit data, the central server needs to calculate communication conditions of all the nodes at the nearby position of this node, and even needs to calculate communication conditions of other nodes that are far away from this node, such that it can decide whether or not this node can successfully transmit or receive data packet. However, according to the present invention, the clique interference coefficient among virtual node cliques has been calculated, and management data are exchanged with other node cliques at a predetermined frequency. This significantly saves the management data overhead.

In another embodiment where there are a great number of virtual nodes, after virtual node grouping, the virtual node cliques can be further grouped into multiple virtual node clusters according to the interference graph among the respective virtual nodes and the clique interference coefficient of the various cliques. Each virtual node cluster is provided with a cluster communication management module, and the cluster communication management module is configured to manage data exchange between an associated virtual node cluster and other various virtual node clusters, so as to emulate communication behavior of the wireless network.

At this point, considering the efficiency of the system and the clique interference coefficient among the virtual node cliques, a maximum containable node number can be set in advance for the virtual node cluster. Within this node number range, the two cliques having the largest clique interference coefficient are merged into one virtual node cluster. The formed virtual node cluster is regarded as a new virtual node clique, continuing to seek two cliques having the largest clique interference coefficient and merging them into a same cluster, until the contained node number reaches the maximum node number of the virtual node cluster or only one virtual node clique is left.

Figure 6:
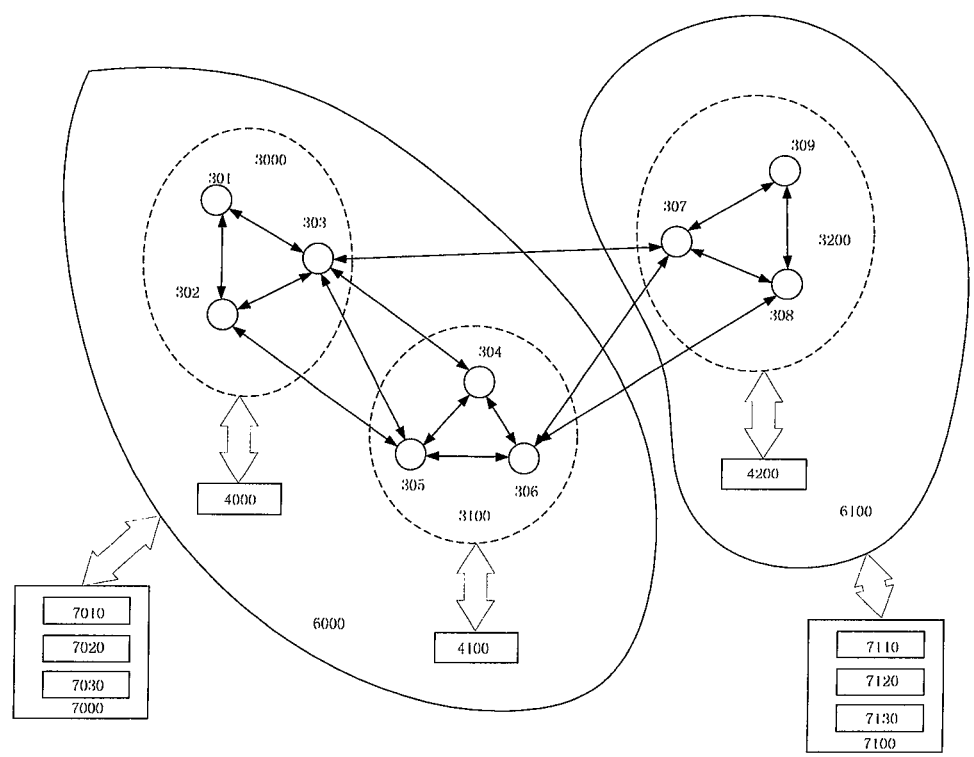
FIG. 6 shows a diagram of virtual node clusters and their associated cluster communication management modules according to the embodiments of the present invention.

For example, as described above, the clique interference coefficient between clique 3000 and clique 3100 is ⅓, the clique interference coefficient between clique 3000 and clique 3200 is ⅑, and the clique interference coefficient between clique 3100 and clique 3200 is ⅔. Referring to FIG. 6, the two cliques, 3000 and 3100, having the largest clique interference coefficient are merged into one cluster 6000, and the remaining virtual node clique 3200 is grouped into cluster 6100. One of ordinary skill in the art should understand that only three virtual node cliques are shown herein for simplicity and clarity. However, the number of the virtual node cliques according to the present invention is not limited to this, and there can be more virtual node cliques. The maximum node number allowed by the virtual node cluster can be set according to actual situations. For example, it can be selected based on test objective or can be set according to the total number of virtual nodes. For example, it is pre-decided to divide all the virtual nodes into three clusters, and then the total number of the virtual nodes in each virtual node cluster can be set to about ⅓ of the total number of all the virtual nodes. Of course, this example is given for description, and one of ordinary skill in the art can conceive other feasible methods for setting virtual node number contained in virtual node cluster.

Cluster communication management modules 7000 and 7100 are respectively provided for virtual node clusters 6000 and 6100. The cluster communication management module 7000 comprises a cluster transmission recording module 7100, a cluster interference coefficient calculating module 7020 and a cluster transmission buffer 7030. Similarly, the cluster communication management module 7100 includes a cluster transmission recording module 7110, a cluster interference coefficient calculating module 7120 and a cluster transmission buffer 7130.

The cluster transmission recording module records each data transmission of the cluster. Some examples of the recorded data transmission of the cluster include transmission purpose, timestamp, channel signal quality, or the like, for being accessed by other clusters. The cluster interference coefficient calculating module calculates cluster interference coefficient among the respective clusters using the above expression (1) according to the interference graph and the respective maximum clique divisions, and uses this coefficient as a frequency for dropping communication that are deemed to be interfered. At this time, the merged cluster can be regarded as one virtual node clique so as to apply the above expression (1). For example, as shown in the figure, cluster 6000 totally contains six nodes, wherein the two nodes 303 and 306 interfere with the nodes 307 and 308 in cluster 6000, and thus, the cluster interference coefficient between cluster 6000 and cluster 6100 is:

$$\text{Max}\left(\frac{1}{6} \cdot \frac{1}{3} + \frac{1}{6} \cdot \frac{2}{3}, \frac{1}{3} \cdot \frac{2}{6} + \frac{1}{3} \cdot \frac{1}{6}\right) = \frac{1}{6} \quad (5)$$

Each virtual node cluster accesses other virtual node clusters that it interferes with according to the calculated cluster interference coefficients and using the same as the probabilities. More specifically, taking cluster 6000 and cluster 6100 as an example, the calculated cluster interference coefficient between the two clusters is ⅙, and thus, cluster 6000 and cluster 6100 each accesses the cluster transmission recording module of its counterpart with a probability of ⅙, so as to obtain data transmission information of its counterpart. For example, the cluster communication management module can contain a random number generator which generates a random number taking an integer range of 1-6. When the random number is 1, it can access the cluster transmission recording module of other clusters. When it finds that cluster 6100 is transmitting data at the time when it accesses the cluster transmission recording module 7100 of cluster 6100, it is deemed that the current data transmission of cluster 6000 is interfered with by cluster 6100, and thus the current data transmission is dropped, waiting for re-transmission or requiring data transmitting party to re-transmit. On the other hand, if it finds that cluster 6100 is not transmitting data, then the communication of cluster 6000 can run normally.

For example, when a plurality of virtual node cliques in a cluster is preparing to transmit data to virtual node cliques within another cluster at the same moment, the cluster transmission buffer 7130 is used for storing data about the plurality of virtual node cliques, and when the cluster communication management module judges that transmission can be performed, transmission is performed from this cluster transmission buffer to the outside or to the respective virtual node cliques within the cluster.

As described above with reference to the virtual node cliques, other factors can be added when converting cluster interference coefficient to access frequency, for example, noise signal brought by other clusters to the current cluster. On the other hand, other factors can be added so as to more veritably emulate interference behavior of an actual wireless network node.

Although herein an emulated wireless network having two clusters is described with reference to FIG. 6, one of ordinary skill in the art should understand that, the number of more clusters is also feasible. One of ordinary skill in the art can use more virtual node clusters according to study and test objectively.

As described above, virtual nodes can be implemented in various ways, for example, using a general computer application, an application-specific integrated circuit, or a form of software/hardware module. In one embodiment according to the present invention, a virtual machine is used to realize virtual nodes.

It is well known that a plurality of virtual machines can be provided on a physical machine to execute different tasks, thereby realizing a purpose of saving cost and enhancing flexibility. Virtual node cliques can be deployed on virtual machine, so as to realize wireless network emulation of a plurality of virtual node cliques with the use of one physical machine.

For example, as shown in FIG. 7, three virtual node cliques together with their corresponding clique communication management modules are respectively disposed on three virtual machines that are located on a same physical machine. In this embodiment, even without the wireless network, emulation of a virtual wireless network can be realized on one physical machine. Accordingly, one of ordinary skill in the art will understand that, a plurality of virtual machines can be provided on physical machine, and each virtual machine can have one clique of virtual nodes executed thereon. The total number of wireless nodes depends on the performance of the physical machine.

As the number of virtual nodes further increases, the multiple virtual node cliques can be further grouped into multiple virtual node clusters. At this point, one virtual node cluster can be provided on one physical machine. As described above, the clique interference coefficient between the respective virtual node cliques can be calculated, and the two virtual node cliques having the largest clique interference coefficient can be merged into one cluster. Then, the formed cluster is regarded as one virtual node clique, continuing to seek virtual node cliques having the largest clique interference coefficient and merging the two. Within a bearable range of physical machine performance, such steps are sustained, and the finally obtained virtual node cluster is provided on one physical machine. Next, again, two virtual node cliques having the largest clique interference coefficient are found and the above steps are repeated, until all the virtual node cliques have been assigned to suitable clusters and provided on physical machine. In this embodiment, cluster communication management modules of virtual node clusters can be provided on one virtual machine. More preferably, cluster communication management modules can be provided on a privileged virtual machine of the physical machine. One of ordinary skill in the art should understand that, the privileged virtual machine means having a virtual machine that can create and manage other physical machines on a physical machine.

Below, the method for establishing a virtualized wireless network according to the present invention will be described. FIG. 8 shows a flowchart of a method according to one embodiment of the present invention. At step 801, a plurality of virtual nodes is set up, and then is divided into multiple virtual node cliques according to interference relations among the plurality of virtual nodes. At step 802, clique communication management module is deployed for each virtual node clique, for managing data exchange between this each virtual node clique and other virtual node cliques, so as to emulate communication behavior of real wireless nodes.

In one embodiment, interference relations among a plurality of virtual nodes are calculated, so as to form an interference graph. Some conditions such as distance between a plurality of virtual nodes and environmental condition (e.g., whether or not a barrier is present) can be set in advance according to specific test objective. Based on the formed interference graph, virtual nodes contained in the maximum clique division of the interference graph are divided into a same virtual node clique.

In another embodiment, clique interference coefficient among the respective virtual node cliques can be calculated according to the interference graph and the respective maximum clique division, and then, the plurality of virtual node cliques are grouped into multiple virtual node clusters according to the clique interference coefficient. The clique interference coefficient can be calculated using the expression (1) according to the interference relations among the respective virtual node cliques in the interference graph. Next, cluster communication management module is deployed for each virtual node cluster, for managing data exchange between this each virtual node cluster and the other respective virtual node clusters, as so to emulate communication behavior of real wireless nodes.

In one embodiment, grouping the plurality of virtual node cliques into multiple virtual node clusters according to the clique interference coefficient comprises the following steps: 1) merging two virtual node cliques having the largest clique interference coefficient into one virtual node cluster; 2) taking the formed virtual node cluster as a new virtual node clique, and repeating the above processing, until the number of the nodes contained in the formed virtual node cluster has already reached the maximum node number allowed by this virtual node cluster; repeating step 1) as noted above in this embodiment, and taking the formed virtual node cluster as a new virtual node clique, and repeating the above processing, until the number of nodes contained in the formed virtual node cluster has already reached the maximum node number allowed by this virtual node cluster or only one virtual node clique is left. When only one virtual node clique is left, this virtual node clique is grouped into a virtual node cluster.

In one embodiment, the clique communication management module comprises a clique transmission recording module and a clique interference coefficient calculating module. The data transmission of one virtual node clique is recorded in the clique transmission recording module of this clique, and at least one clique interference coefficient between this virtual node clique and at least one of the other virtual node cliques is calculated using the clique interference coefficient calculating module according the interference graph and the maximum clique division. The clique communication management module of this virtual node clique accesses clique transmission recording module of another virtual node clique that it interferes with using the calculated clique interference coefficient as the frequency, so as to obtain data transmission record of the another virtual node clique, and when it finds that the another virtual node clique is transmitting data, the current data transmission of this clique is dropped.

In the embodiment where the respective virtual node cliques are grouped into multiple virtual node clusters, in addition to the above method executed by the clique communication management module, each virtual node cluster is provided with a cluster communication management module. The cluster communication management module comprises a cluster transmission recording module, a cluster interference coefficient calculating module and a cluster transmission buffer. The cluster transmission buffer is used for buffering transmission data of at least one virtual node clique. The cluster transmission recording module records data transmission of this virtual node cluster for being accessed by other clusters. Examples of recorded data include transmission purpose, timestamp, channel signal quality, or the like. The cluster interference coefficient calculating module calculates at least one cluster interference coefficient between this virtual node cluster and at least one of the other virtual node clusters. For example, with reference to the above described calculating method, the cluster interference coefficient is calculated using the interference graph and the expression (1).

Wherein, the cluster communication management module of one virtual node cluster accesses the group transmission recording module of another virtual node cluster that it interferes with using the calculated cluster interference coefficient as the frequency, so as to obtain the data transmission record of the another virtual node cluster, and when it finds that the another virtual node cluster is transmitting data, the current data transmission of this cluster is dropped.

In the embodiments according to the present invention, the above method for forming a virtualized wireless network can be implemented with various carriers. For example, a manner of physical machine and virtual machine can be used. However, the present invention is not limited to this. A form of application-specific integrated circuits can be employed for realizing virtual nodes and the functions of its associated communication management module. Of course, it is also possible to employ physical machines completely to realize a virtualized wireless network.

In one embodiment, a physical machine is provided. A plurality of virtual machines is deployed on the physical machine. One virtual node clique and a clique communication management module associated with this virtual node clique are provided on one virtual machine.

When there are a great number of virtual nodes, several physical machines can be provided, with each physical machine having a plurality of virtual machines deployed thereon. One virtual node clique and a clique communication management module associated with this virtual node clique are provided on one virtual machine, and the multiple virtual node cliques belonging to a same virtual node cluster and the associated cluster communication management module are provided on the same physical machine.

In the embodiment employing a form of physical machine and virtual machine, the cluster communication management module can be provided in a privileged virtual machine in the physical machine.

According to the above method, each virtual node clique can become interested in data transmission of virtual nodes within its own clique, and knows data transmission situation of other virtual node cliques at a certain frequency. Thus, mass data processing caused by providing a central server as well as performance bottleneck and high reliability requirements resulted there from can be avoided.

The description of the present invention has been presented for purposes of illustration and description, but is not intended to be exhaustive or limited to the disclosed embodiments. Many modifications and variations will be apparent to one of ordinary skill in the art without departing from the scope and spirit of the invention. The embodiment was chosen and described in order to best explain the principles of the invention and the practical application, and to enable one of ordinary skill in the art to understand the invention for various embodiments with various modifications as are suited to the particular use contemplated.

We claim:

1. A method for establishing a virtualized wireless communication system, comprising the steps of:
   setting up a plurality of virtual nodes, the plurality of virtual nodes being divided into multiple virtual node cliques according to interference relations among the plurality of virtual nodes, wherein each virtual node represents one wireless communication node;
   deploying a clique communication management module for each virtual node clique, the clique communication management module being configured to manage data exchange between the virtual node clique and other virtual node cliques, so as to emulate communication behavior of the wireless communication node;
   wherein dividing the plurality of virtual nodes into multiple virtual node cliques according to interference relations among the plurality of virtual nodes comprises:
   forming an interference graph according to interference relations among the plurality of virtual nodes, and dividing virtual nodes contained in each maximum clique division of the interference graph into one virtual node clique;
   calculating clique interference coefficients among the respective virtual node cliques according to the interference graph and the respective maximum clique divisions;
   grouping the multiple virtual node cliques into multiple virtual node clusters according to the clique interference coefficients; and
   deploying a cluster communication management module for each virtual node cluster, the cluster communication management module being configured to manage data exchange between the virtual node cluster and other virtual node clusters so as to emulate communication behavior of a real wireless node.

2. The method for of claim 1, wherein grouping the multiple virtual node cliques into multiple virtual node clusters according to the clique interference coefficients comprises:
   merging two virtual node cliques having the largest clique interference coefficient into one virtual node cluster;
   taking the virtual node cluster as a new virtual node clique, repeating the above processing until the number of nodes contained in the virtual node cluster has already reached the maximum node number allowed by the virtual node cluster or only one virtual node clique is left; and
   grouping the virtual node clique into one virtual node cluster when only one virtual node clique is left.

3. The method for claim 1, wherein each one of the clique communication management modules further includes:
   i) clique transmission recording module configured to record data transmission of the virtual node clique in the clique transmission recording module and;
   ii) clique interference coefficient calculating module configured to calculate at least one clique interference coefficient between the virtual node clique and at least one of the other virtual node cliques by using the clique interference coefficient calculating module according to the interference graph and the maximum clique division;
   wherein, clique communication management module of one virtual node clique accesses clique transmission recording module of another virtual node clique to which the clique interference coefficient is related at a frequency related to the calculated clique interference coefficient, so as to obtain data transmission record of the another virtual node clique, and when it finds that the another virtual node clique is transmitting data, dropping the current data transmission;
   wherein said cluster communication management module comprises a cluster transmission recording module, a cluster interference coefficient calculating module, and a cluster transmission buffer:
   said cluster transmission buffer is used for buffering data transmission of at least one virtual node clique in the virtual node cluster;
   said cluster transmission recording module records data transmission of the virtual node cluster, the cluster interference coefficient calculating module calculates at least one cluster interference coefficient between the virtual node cluster and at least one of the other virtual node clusters; and
   wherein, cluster communication management module of one virtual node cluster accesses cluster transmission recording module of another virtual node cluster that the cluster interference coefficient involves at a frequency related to the calculated cluster interference coefficient, so as to obtain data transmission record of the another virtual node cluster, and when it finds that the another virtual node cluster is transmitting data, dropping the current data transmission.

4. The method for claim 3 further comprising the steps of:
   providing a plurality of physical machines;
   setting up a plurality of virtual machines on each physical machine;
   providing one virtual node clique and a clique communication management module associated with the virtual node clique on one virtual machine;
   providing the multiple virtual cliques belonging to a same virtual node cluster, associated clique communication management modules, and associated cluster communication management modules on a same physical machine.

5. The method for claim 4 further comprising the step of:
providing the cluster communication management modules in a privileged virtual machine on the physical machine.

6. A method for establishing a virtualized wireless communication system, comprising the steps of:
setting up a plurality of virtual nodes, the plurality of virtual nodes being divided into multiple virtual node cliques according to interference relations among the plurality of virtual nodes, wherein each virtual node represents one wireless communication node; and
deploying a clique communication management module for each virtual node clique, the clique communication management module being configured to manage data exchange between the virtual node clique and other virtual node cliques, so as to emulate communication behavior of the wireless communication node;
wherein dividing the plurality of virtual nodes into multiple virtual node cliques according to interference relations among the plurality of virtual nodes comprises:
forming an interference graph according to interference relations among the plurality of virtual nodes, and dividing virtual nodes contained in each maximum clique division of the interference graph into one virtual node clique; and wherein each of the clique communication management modules comprises:
a clique transmission recording module, wherein the clique transmission module is configured to record data transmission of the virtual node clique in the clique transmission recording module;
a clique interference coefficient calculating module, wherein the clique interference calculating module is configured to calculate at least one clique interference coefficient between the virtual node clique and at least one of the other virtual node cliques by using the clique interference coefficient calculating module according to the interference graph and the maximum clique division; and
a clique communication management module of one of virtual node cliques that accesses the clique transmission recording module of another virtual node clique to which the clique interference coefficient is related, so as to obtain data transmission record of the another virtual node clique, and when it finds that the another virtual node clique is transmitting data, dropping the current data transmission.

7. The method for claim 6 further comprising the steps of:
providing physical machine;
setting up a plurality of virtual machines on the physical machine;
providing one virtual node clique and a clique communication management module associated with the virtual node clique on one virtual machine.

* * * * *